US006898642B2

(12) United States Patent
Chafle et al.

(10) Patent No.: US 6,898,642 B2
(45) Date of Patent: May 24, 2005

(54) SYNCHRONOUS COLLABORATION BASED ON PEER-TO-PEER COMMUNICATION

(75) Inventors: Girish Bhimrao Chafle, New Delhi (IN); Manish Gupta, New Delhi (IN); Neeran Mohan Karnik, New Delhi (IN); Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 09/836,120

(22) Filed: Apr. 17, 2001

(65) Prior Publication Data

US 2002/0152271 A1 Oct. 17, 2002

Related U.S. Application Data

(63) Continuation of application No. 09/550,460, filed on Apr. 17, 2000.

(51) Int. Cl.$^7$ .............................................. G06F 15/16
(52) U.S. Cl. ...................... 709/248; 709/203; 709/207; 709/230; 709/251; 713/375
(58) Field of Search ..................... 709/201, 203–207, 709/223, 224, 230, 238, 248, 251; 370/260–266, 391, 352; 713/375, 400

(56) References Cited

U.S. PATENT DOCUMENTS

| | | | |
|---|---|---|---|
| 5,583,993 A | | 12/1996 | Foster et al. |
| 5,689,508 A | * | 11/1997 | Lyles ........................ 370/391 |
| 5,968,133 A | * | 10/1999 | Latham et al. .............. 709/248 |
| 6,151,621 A | | 11/2000 | Colyer et al. |
| 6,321,252 B1 | * | 11/2001 | Bhola et al. ................ 709/204 |
| 6,438,702 B1 | * | 8/2002 | Hodge ........................ 713/400 |
| 6,556,724 B1 | * | 4/2003 | Chang et al. ............... 382/299 |
| 6,629,249 B2 | * | 9/2003 | Gonzalez .................... 713/400 |
| 2002/0035602 A1 | * | 3/2002 | Garcia-Luna-Aceves et al. |
| 2002/0073228 A1 | * | 6/2002 | Cognet et al. |
| 2002/0091846 A1 | * | 7/2002 | Garcia-Luna-Aceves et al. |
| 2002/0112244 A1 | * | 8/2002 | Liou et al. |

OTHER PUBLICATIONS

Ozgur Ulusoy, "Lock–based concurrency control in distributed real–time database systems", Journal of Database Management, Hershey: Spring 1993, vol. 4, Issue 2, p. 3 (14 pages).*

Bennett, Jon C. R. et al., "High Speed, Scalable, and Accurate Implementation of Packet Fair Queueing Algorithms in ATM Networks", 1997 International Conference on Network Protocols Proceedings, Oct. 28–31, 1997, pp. 7–14.*

* cited by examiner

Primary Examiner—Anthony Knight
Assistant Examiner—Crystal J Barnes
(74) Attorney, Agent, or Firm—Whitham, Curtis & Christofferson, P.C.; T. Rao Coca

(57) ABSTRACT

A peer-to-peer protocol is based on the use of global timestamps and client priorities in serializing modifications to a shared workspace of real-time collaboration. The method caters to dynamic clients wherein a client can leave or join an ongoing collaboration session as long as there is always at least one client present/remaining in the collaboration session. The method can support multiple definitions of a modification, including partitioning-based definitions, wherein the method provides full support for locking of partitions, and a full treatment of inter-partition synchronization via a modification definition over multiple partitions. The method is capable of utilizing the many standard methods of creating a global, distributed, synchronized clock for the global timestamps utilized by it. The method is rollback-based for correcting tentative but incorrect serializations, and provides additional backup in terms of checkpoints for additional safety and for the support of lightweight, pervasive clients. The method includes many optimizations for efficiency, and includes a method of switching to and back from distributed server-based serialization for the periods when the network response is better suited to a distributed server than the peer-to-peer protocol.

24 Claims, 14 Drawing Sheets

1. SEND A REQUEST, AN ARTIFICIAL MODIFICATION, FOR LEAVING THE COLLABORATION SESSION.
2. WHEN A CHECKPOINT IS FORMED WHOSE E IS GREATER THAN OR EQUAL TO THE TIMESTAMP OF THE ARTIFICIAL MODIFICATION IN 1, EACH CLIENT REMOVES CHANNELS TO AND FROM THE LEAVING CLIENT

1. SEND A REQUEST, AN ARTIFICIAL MODIFICATION, FOR LEAVING THE COLLABORATION SESSION.
2. WHEN A CHECKPOINT IS FORMED WHOSE E IS GREATER THAN OR EQUAL TO THE TIMESTAMP OF THE ARTIFICIAL MODIFICATION IN 1, EACH CLIENT REMOVES CHANNELS TO AND FROM THE LEAVING CLIENT

SYNCHRONOUS COLLABORATION BASED ON PEER-TO-PEER COMMUNICATION

CROSS REFERENCE TO RELATED APPLICATIONS

This application is a continuation of U.S. application Ser. No. 09/550,460, filed Apr. 17, 2000.

The subject matter of this application is related to co-pending patent applications Ser. No. 09/241,991 filed Feb. 2, 1999, by Pradeep Varma and Suresh Kumar for "Distributed Server for Real-Time Collaboration" and Ser. No. 09/476,445 filed Dec. 30, 1999, by Pradeep Varma for "Dynamic Clients, Dynamic Partitions, Locking and Migration Capability for Distributed Server for Real-Time Collaboration", which are assigned to a common assignee herewith. The disclosure of applications Ser. No. 09/241,991 and 09/476,445 are incorporated herein by reference.

BACKGROUND OF THE INVENTION

1. Field of the Invention

The present invention generally relates to computer software for collaborative work and, more particularly, to a synchronous collaboration system in which modifications are serialized solely by peer-to-peer communication among collaboration front-end processes or clients. No back-end software process or processes are used for serializing modifications.

2. Background Description

Software for collaborative work, i.e., work involving many users and/or agents falls into two categories of use. One is termed asynchronous collaboration and the other, synchronous collaboration. Examples of software for asynchronous collaboration are groupware such as Lotus Notes and Microsoft Exchange. These along with other examples such as discussion groups where data is changed batchwise have the characteristic that neither do they require, nor do they particularly cater to the concurrent presence of many users and agents in the work environment. Work environment can include all users and agents that use computers that are connected to each other by networks such as Internet or intranets. In contrast to software for asynchronous collaboration, software for synchronous collaboration is designed to cater to concurrent users and agents. It includes collaboration tools such as chat, concurrent whiteboards and the more sophisticated SameTime environment. These tools provide for real-time interaction among groups using the same shared workspace. Whatever be the workspace—document, spreadsheet, CAD drawing etc.—it can be seen and modified by the collaborators, simultaneously. Modifications to the workspace are made available to all group members, immediately and synchronously.

Synchrony in multiple updates made by collaboration participants has to be ensured by the underlying synchronous collaboration implementation. One of the common ways by which this is done currently is by the inclusion of a centralized server. A centralized server is a software process running on one host machine, a hardware computer or computing element, that introduces a serialization order among multiple, concurrent modifications. Thus multiple, simultaneous updates to a shared workspace are communicated to the server which converts them into a sequential stream of updates to the workspace. The sequential stream of updates is then reflected back to all participants, each of whom is assumed to be running a software process, a client, in order to interact with the workspace. Each participant or client thus sees the shared workspace develop in, an identical manner—starting from the same initial state and changing under the same stream of updates—as any other participant or client of the collaboration.

As collaboration needs scale up—number of clients changing the workspace, number of changes to the workspace, and number of synchronous views of the workspace goes up—the single server process running on a single machine and the interconnection network bringing about communication between the server and the clients can become severely loaded with computation and communication requirements. Indeed, since the architecture of the collaboration implementation is such that it focuses all communication to one point in the interconnection network, namely the server's machine, the development of an unbalanced load in the interconnection network takes place. It is possible that the interconnection network cannot effectively service the "hot spot" of communication, viz. the server's machine, despite being relatively lightly loaded in other parts of network or on the average. The result can be unacceptable delays and degradation in performance from the perspective of collaboration participants.

The inventions disclosed in co-pending patent applications Ser. Nos. 09/241,991 and 09/476,445 address this issue by breaking the one, centralized, software, server process into multiple, independently communicating, asynchronous, independent (i.e., no shared memory, data, variables), software processes. The multiple software processes are a part of a distributed server. The distributed server provides a functionality that is equivalent to the basic functionality provided by the centralized server, namely, the modification-serialization functionality. The multiple software processes of a distributed server can be distributed to different machines (which can be heterogeneous or homogeneous) available on the interconnection network and can be run simultaneously on the machines. Thus, a distributed sever can avoid focusing all communication to one point in the interconnection network and can diffuse away the "hot spot" of a centralized server into different parts of the network. The distributed server can enhance interoperability across diverse software and hardware platforms via real-time collaboration.

SUMMARY OF THE INVENTION

It is therefore an object of the present invention to provide a way to eliminate the use of a software serialization server so that clients can carry out real-time collaboration without relying on a centralized or distributed server as a back-end.

According to the invention, there is provided a peer-to-peer protocol based on the use of global timestamps and client priorities in serializing modifications to a shared workspace of real-time collaboration. The method provided herein caters to dynamic clients wherein a client can leave or join an ongoing collaboration session as long as there is always at least one client present/remaining in the collaboration session. The method can support multiple definitions of a modification, including partitioning-based definitions, wherein the method provides full support for locking of partitions, and a full treatment of inter-partition synchronisation via a modification definition over multiple partitions. The method is capable of utilizing the many standard methods of creating a global, distributed, synchronized clock for the global timestamps utilized by it. The method is rollback-based for correcting tentative but incorrect serializations, and provides additional backup in terms of checkpoints for additional safety and for the support of lightweight, pervasive clients. The method includes many optimizations for efficiency, and includes a method of switching to and back from distributed server-based serialization for the periods when the network response is better suited to a distributed server than the peer-to-peer protocol.

In comparison to the centralized server and the distributed server, the invention disclosed herein further improves interoperability across heterogeneous software/hardware platforms by (a) providing a new method of improving efficiency and scalability of real-time collaboration without relying on the use of any special support from the network/back-end supporting the collaboration session, (b) being able to work in conjunction with a distributed server for providing a better improvement in efficiency/scalability/throughput of real-time collaboration, and (c) providing special support via optimizations and methods oriented towards lightweight clients suited to pervasive devices, which are likely to comprise a large part of heterogeneous environments in the near future.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
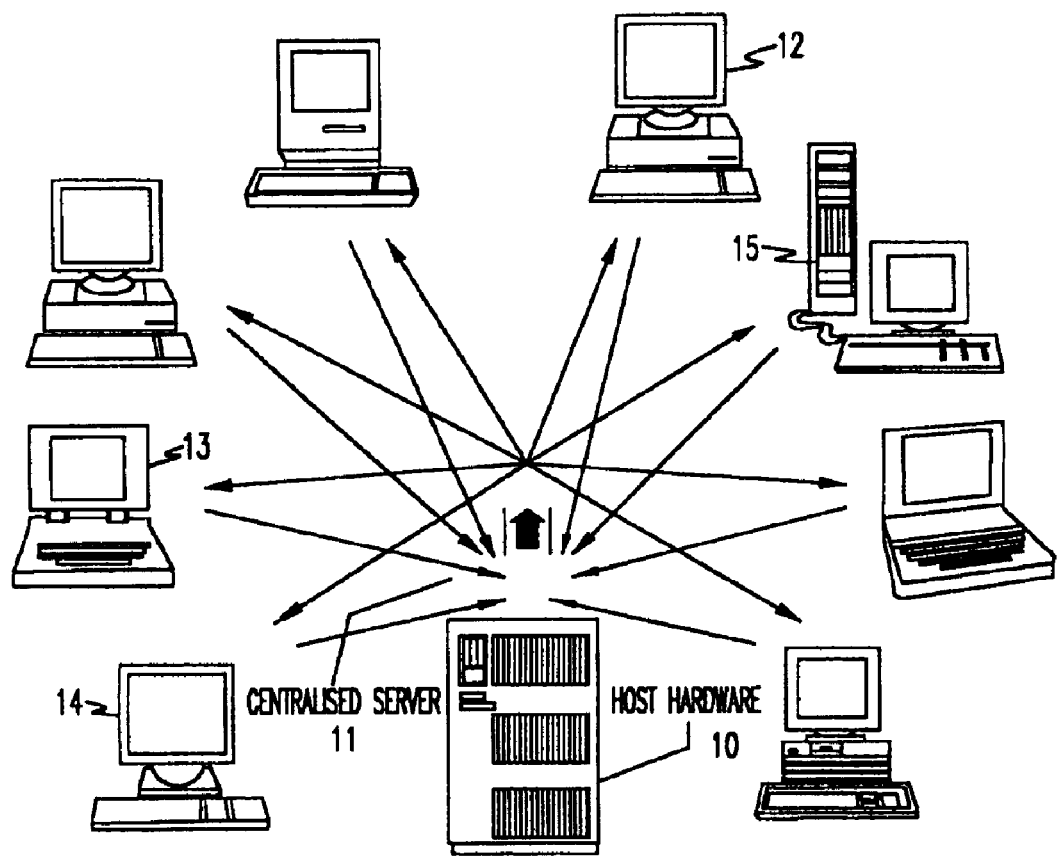
FIG. 1 is a schematic diagram showing a typical centralized server known in the prior art.

Referring now to the drawings, and more particularly to FIG. 1, there is shown a simple centralized server 11 running on a host hardware system 10. The server is comprised of a First In, First Out (FIFO) queue structure in which modifications coming from various clients are entered. These clients are collaboration software front-end which interact with collaboration participants. The clients may be running on desk top computers, such as computer 12, laptop computers, such as computer 13, network computers, such as computer 14, or work stations, such as computer 15. A client sends modifications to the server on a channel that is itself a FIFO structure. The server 11 picks a modification from one of the outputs of channels coming from clients and enters it into its FIFO queue. The order in which modifications get entered in the server's queue forms the order of serialization of the modifications. The output of the server's FIFO queue is broadcast to all clients over channels that are FIFO structures. Thus, the architecture of a simple centralized server is channel-order preserving; i.e., the order in which a client puts modifications on its channel to the centralized server is preserved in the serialized stream of modifications sent back to the client by the server.

In the invention disclosed in application Ser. No. 09/241,991, the distributed server is based on the observation that if a workspace can be broken up into disjoint partitions which can be modified independently of each other, then any concurrent modifications to the partitions need not be sent to one centralized server for the sake of serializing them. Each partition can be assigned an independent server, and only modifications pertaining to that partition need to be serialized by its assigned server. Workspaces can be partitioned in many different ways. Examples are paragraphwise for a text document, tableswise for a spreadsheet application, and objectwise for a three-dimensional (3D) application showing 3D objects. In general, the partitioning of a workspace can be static, or in other words, it does not change during a collaboration session, or it can be dynamic, which implies that it can change during a collaboration session. If the partitioning is static only, then in the examples above, creation and deletion of paragraphs, tables and objects cannot happen during a collaboration session. The individual paragraphs, tables, objects can be modified, emptied, expanded, however, no whole paragraph etc. can be deleted or created as such. Creation and deletion of these entities requires that the partitioning of the workspace be dynamic. The distributed server in application Ser. No. 09/241,991 caters to static partitionings only.

Figure 2:
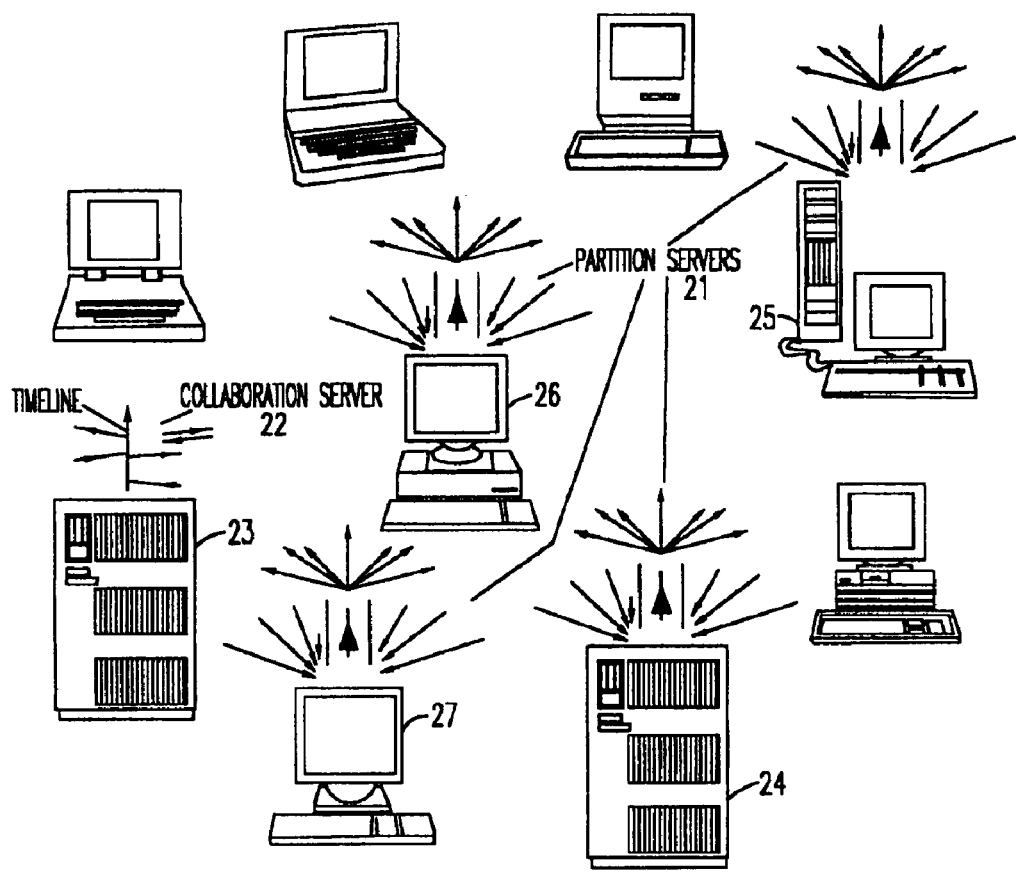
FIG. 2 is a schematic diagram showing the distributed server disclosed in patent application Ser. No. 09/241,991.

FIG. 2 illustrates an example of a distributed server according to the invention disclosed in application Ser. No. 09/241,991. A distributed server includes a server 21 for each partition, i.e., partition servers, and one collaboration server 22 that provides support for compound modifications. The distributed server includes two or more (one collaboration server, and at least one partition server) independently-communicating, asynchronous, independent (i.e., no shared memory, data, variables) software processes that can run simultaneously on one or more heterogeneous or homogeneous, interconnected computers and/or computing elements, here represented by host hardware systems 23 and 24, work station 25, desk top computer 26, and network computer 27.

Figure 3:
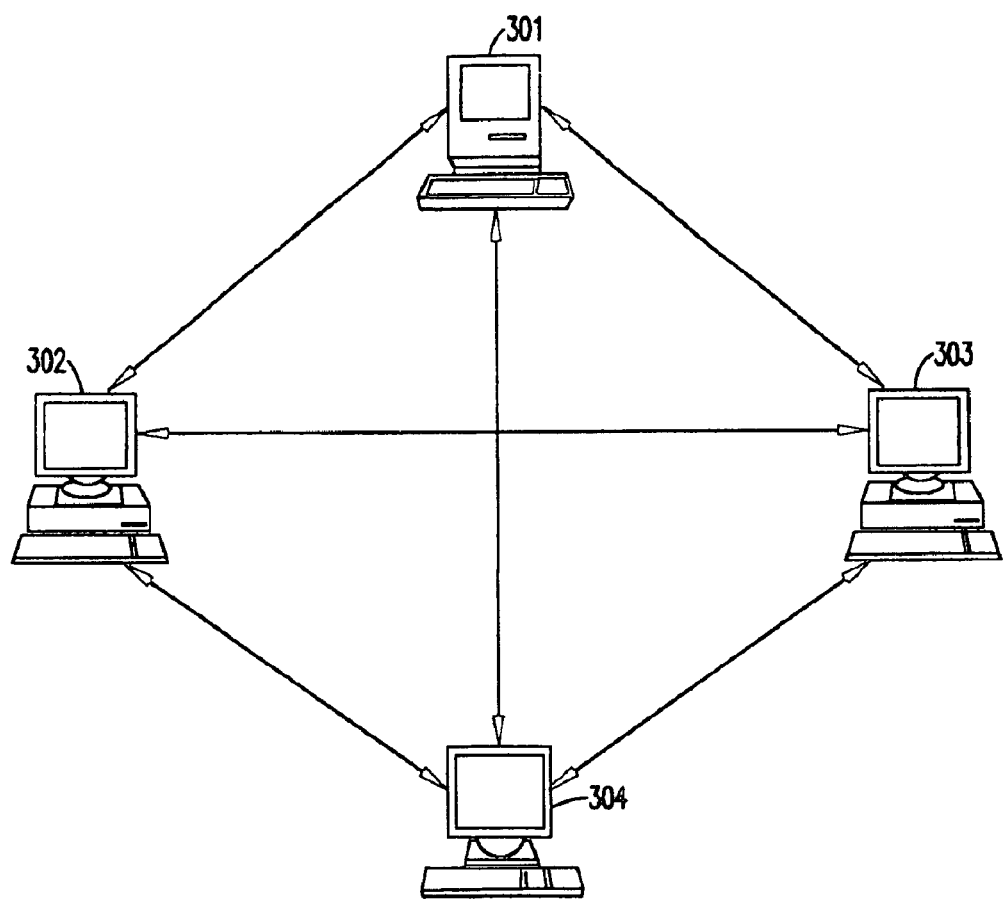
FIG. 3 is a schematic diagram showing the structure of a peer-to-peer protocol where each client is connected to every other client via two-way FIFO channel pairs (for bidirectionality)

FIG. 3 illustrates our peer-to-peer serialization protocol. Desk top computers 301, 302, and 303 and a network computer 304 are connected in a peer-to-peer network; that is, there is no server, either centralized as in FIG. 1 or distributed as in FIG. 2. The clients, i.e., computers 301 to 304, are connected to each other by first-in, first-out (FIFO) communication channels. The peer-to-peer serialization protocol is a timestamp and priority-based protocol. The timestamp is based on one global clock that is distributed and kept synchronized among the clients participating in a collaboration session. The clock distribution and maintenance of clock synchrony can be done by standard methods, as will be described in more detail below.

We first describe our invention in a hypothetical setting with some idealistic assumptions. Later we replace the idealistic assumptions with practical methods, thereby replacing the hypothetical setting by a real-world setting. The practical methods enabling this shift form a part of our invention. Each client in our invention is a software process. Let us assume that each client is connected to every other client by a zero-delay network and buffers. So broadcast of data from one client to all other clients happens instantaneously. In this context, assuming that no two clients broadcast at the same instant, the clients can serialize their modifications relatively straightforwardly as follows: Each client has with itself a serialized modifications queue reflecting the serialized order of modifications. Every time a client wants a modification serialized, it does a zero-time broadcast of its modification, which places the modification in the serialized-modifications queue of each client (including itself) in zero time. Since time in digital systems is discrete, the case of simultaneous broadcast of two modifications needs to be treated, which can be done as follows: Each client has assigned to itself, a static priority for its broadcast. When broadcasts from two clients arrive at the same time, then the client with the higher priority wins over the client with lower priority, and its modification is placed first in each serialized-modification queue. The static priority of each client is known to every client at the outset.

Unfortunately, zero-time networks and buffers are unrealizable. The above method of serialization is thus required to work with nonzero-time networks and buffers, which is now carried out as follows. Each client is assumed to have a perfect global clock available to itself. Thus, all clients are in perfect synchrony as far as looking up time is concerned. The network and buffers connecting the clients are not zero time. Indeed, they are as variable and unknown as they can get to be in real networks. However, the communication channels are ordered—as FIFO. Thus, broadcasts from one client arrive in the same order on all clients, and the order is the same as the order in which they were broadcast by the sender. In addition to assuming broadcast of modifications over these channels, we assume one (of many commonplace) means for independent broadcast and independent communication of non-modification data between clients. The means is free to reuse the modification broadcast channels and the modifications sent thereupon for optimization purposes, so long as the means does not compromise the independence of the non-modification communication with the modification communication. In the rest of this disclosure, we explicitly point out where we utilize independent communication and where we utilize modification communication.

The details of the modification communication are as follows. Each client maintains one FIFO queue for incoming broadcasts from each broadcasting client including itself Whenever a client broadcasts a modification, it stamps the modification with the global time of when it broadcasts the modification. The timestamped modification lands itself, in the incoming queue for the sending client in each receiving client. Each client can serialize the incoming modifications sitting in the sender-specific queues as follows: the client can pick a modification with the earliest timestamp and place it in the serialization queue. This choice can turn out to be wrong because a modification with an earlier timestamp, can be en route when this choice is made and when such a modification arrives, the client finds itself facing the task of rolling back the wrong choice made earlier.

Consider the set of next-to-go modifications comprising modifications taken from the head of non-empty incoming queues. Lift out from this set the set of timestamps corresponding to the modifications. For each empty queue, add to the lifted out timestamps the timestamp of the last chosen modification (if any) from the empty queue. If there is no last chosen modification from an empty queue, then add a timestamp corresponding to the start of the collaboration session to the session to the lifted timestamps. Let E be the earliest timestamp in this final set of lifted out timestamps. Now, since modifications arrive in order from any individual broadcaster, clearly, no modification can be en route that is stamped with a time that is earlier than E. Thus, the algorithm followed by a client for serializing modifications is as follows: the client picks a modification with the earliest timestamp from all present next-to-go modifications and places it in the serialization queue, while making a provision for rolling back this choice up to the currently known timestamp E for the client. The rollback window of time is thus defined by the earliest of its present next-to-go timestamps (P) and E, i.e. [E, P].

Figure 6:
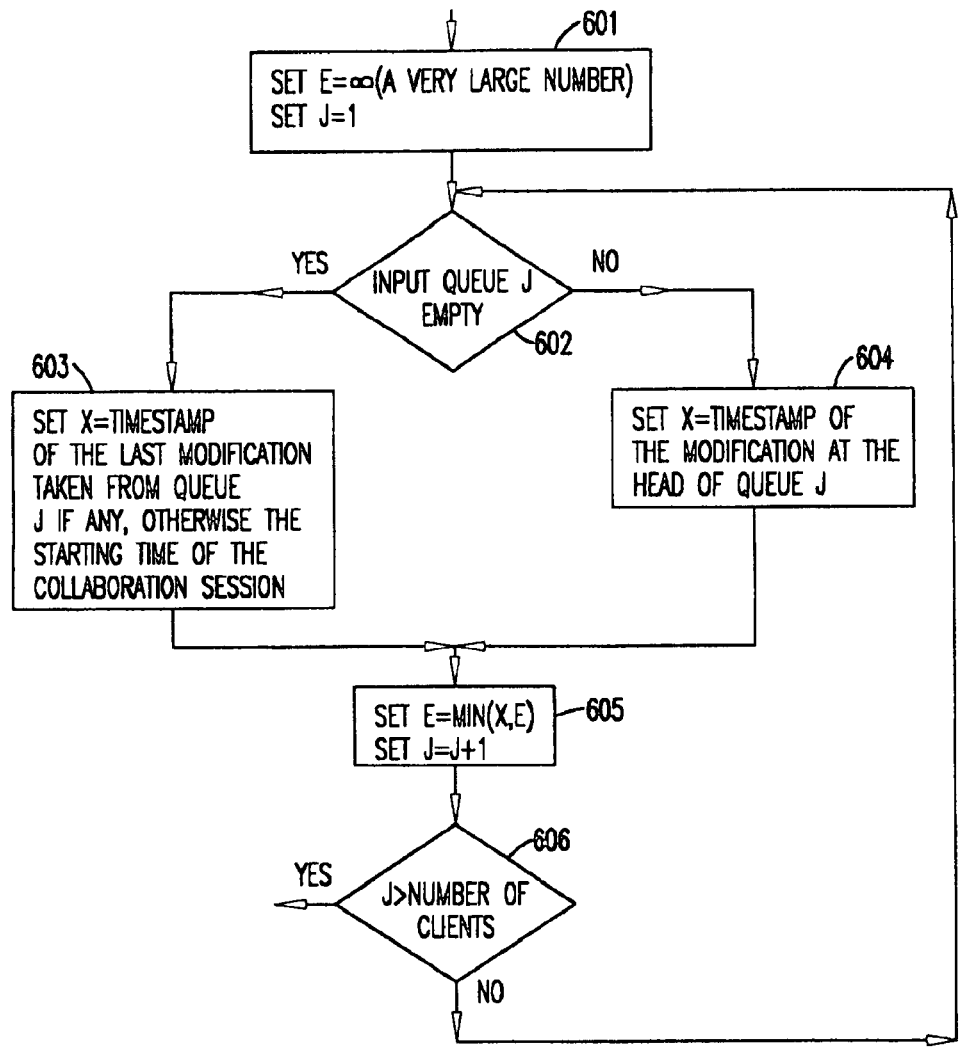
FIG. 6 is a flow diagram showing the computation of time E.

FIG. 6 illustrates the computation of E. The process begins by initializing E to a very large number and the index j to 1 in function block 601. Then a test is made in decision block 602 to determine if the input queue j is empty. If so, x is set in function block 603 to the timestamp of the last submitted modification in the queue j, if any, or, in the alternative, to the starting time of the collaboration session if there is no last submitted modification. On the other hand, if the queue j is not empty, then x is set to the timestamp of the head of the line modification in the queue in function block 604. E is set to the minimum of x and E and the index j is incremented by 1 in function block 605. A test is made in decision block 606 to determine if j is greater than the number of clients in the collaboration session. If not, the process loops back to decision block 602; otherwise, the process is completed.

A client can behave in the following conservative manner in order to avoid rollback: the client awaits arrival of next-to-go timestamps on all of its incoming queues before it picks the earliest among them for entry into its serialization queue. Since another client can be quiet (i.e., not creating any modifications) for an indefinite amount of time, such a client at hand can end up blocking the conservative serialization process indefinitely. This problem can be circumvented by eliminating quiet clients, i.e., requiring each client to send modifications periodically, even if the modifications are null. The costs of such elimination of rollback are thus twofold—an increased latency in making the serialization choice, and increased communication due to the forced periodic broadcasts requirement. A clear implication of the increased latency is the progressive loss of interactivity with the shared workspace which is an important requirement in synchronous collaboration.

Figure 4:
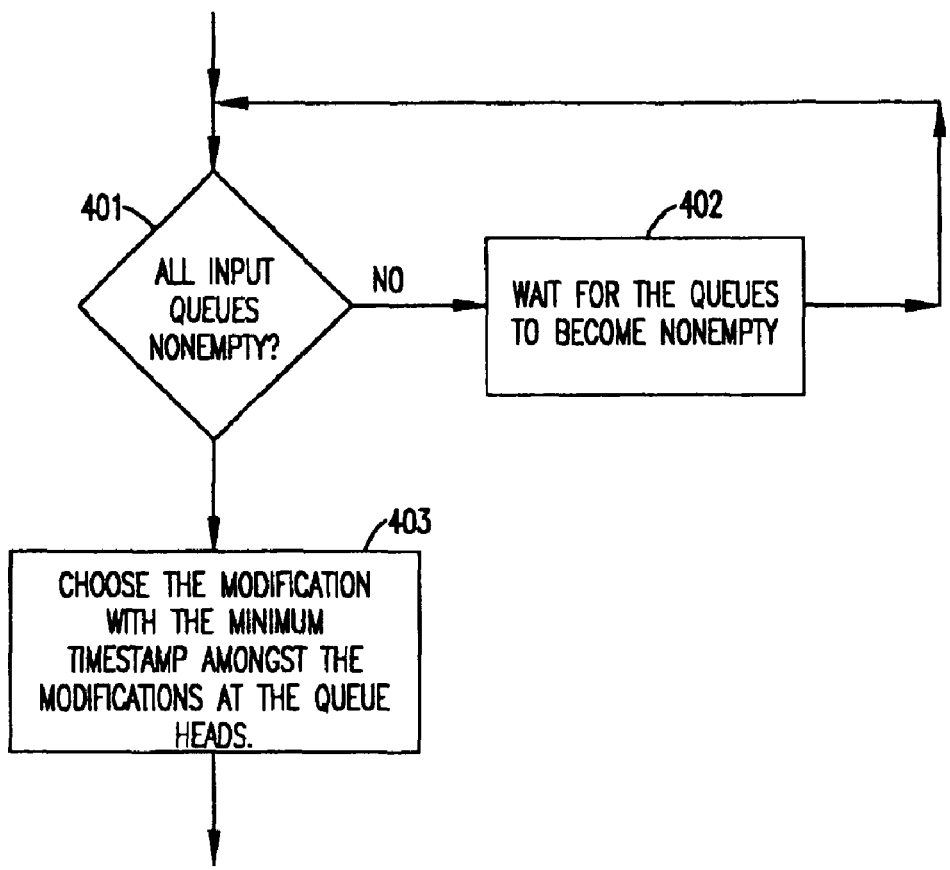
FIG. 4 is a flow diagram showing the logic of the algorithm to serialize modifications in a no-rollback implementation of the invention.

FIG. 4 illustrates the serialization protocol without rollback. A test is made in decision block 401 to determine if all queues are non-empty. If not, the process waits for the queues to become nonempty in function block 402 before returning to decision block 401. When all input queues are empty, the modification with the minimum timestamp amongst the modifications at the queue heads is chosen in function block 403.

Accepting rollback by accepting serialization decisions as tentative requires storing collaboration state including some modifications as backup for rollback. The upper bound on this storage comprises of all the modifications whose timestamps fall in [E, P] and the workspace state at time E. If this storage requirement turns out to exceed a client's capacity, then the client needs to work in an optimistic mode, hoping that no unrecoverable rollback occurs, and if one does, then asking its neighbors using independent communication to assist the client by providing it with the parts of collaboration history that the client has not kept. Periodic checkpoints can also help in this exercise wherein it is simply the best for all clients to roll back to some common recent checkpoint if one or more of the clients face unrecoverable rollbacks.

Figure 5:
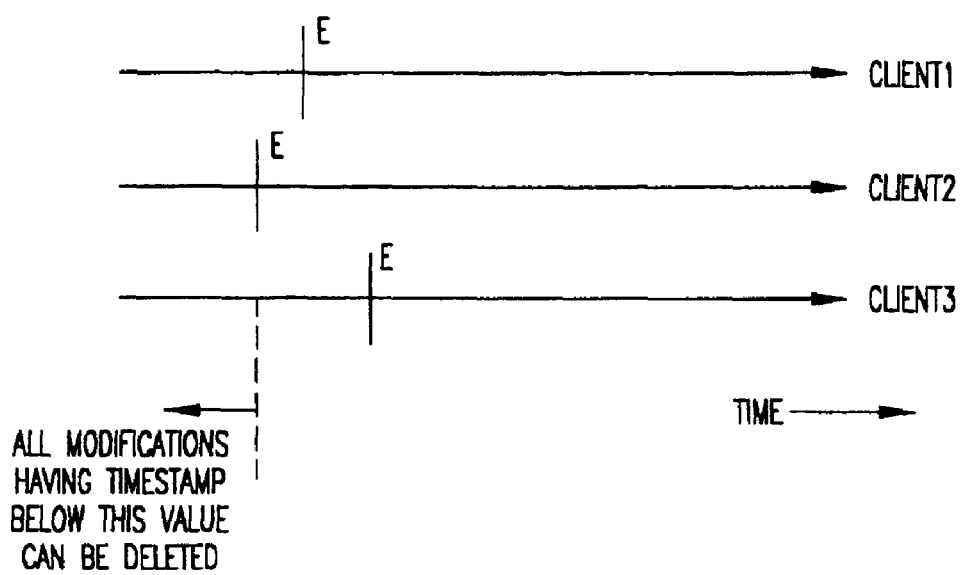
FIG. 5 is a timing diagram showing that a check point can be formed at time E of client 2.

Checkpoints are created as follows. Periodically, all clients synchronize to determine the earliest E for all the clients as follows. Using independent communication, periodically a chosen client receives each client's E, either upon an request from the chosen client to others or otherwise. The earliest E is the minimum among the E values received by the chosen client. The chosen client then creates a special modification, an artificial modification which contains the earliest E and the identity of the next chosen client (which can continue to be the current chosen client). The artificial modification is broadcast to all clients using ordinary modification communication. Upon serialization and processing of this artificial modification, each client advances its previous checkpoint to the workspace state at E contained in the artificial modification. Each client is then free to reclaim the space of the old checkpoint and the modifications preceding E. Not all the clients need to create and maintain checkpoints due to memory constraints. For this purpose, checkpointing can be shared, wherein a client with a larger memory capacity does the checkpoint storage for more than itself and provides checkpoint state to others on request. The choice of the initially chosen client for checkpointing can be made statically, a collaboration startup time. Note that the serialized processing of the checkpoint-advancing artificial modification faces the usual hazards that other modifications face—at a given client, there can be a rollback within its window to the local E, and there can be more general preemption of the sorts discussed below. Some of these rollbacks, the rollback to the previous checkpoint, can completely eliminate the checkpoint advance, leaving its resurrection to the next periodic synchronization. FIG. 5 illustrates a computation of checkpoints.

Invocation of rollback to checkpoint can be carried out by a client as follows. The client sends an artificial modification for the purpose, whose processing upon serialization requires the following—all clients roll back to the last checkpoint they have created and throw away all modifications after the checkpoint (i.e., modification with a timestamp greater than the E of the last checkpoint). This throwing away of modifications causes not only the destruction of the rollback modification itself, but also causes the destruction of the artificial modification that creates the last checkpoint, unless the timestamp of this checkpoint-advancing modification is larger than E contained in it. Regardless, the rollback ensures that all clients restart collaboration from the last checkpoint onwards. Also note that since the last checkpoint is itself defined in terms of serialized modifications and timestamps, the scheme for rollback to last checkpoint is self-consistent. Again, note that the serialized processing of rollback-to-last-checkpoint modifications face the usual rollback hazards faced by other modifications.

It is sometimes convenient to force a freeze on the checkpoint-advancing mechanism. This freeze can be enforced via the serialization mechanism of modifications as follows. A checkpoint freeze or checkpoint unfreeze request is invoked by a client sending an artificial modification of the purpose to all clients. The serialized processing of a freeze modification requires all clients to either defer or destroy all checkpoint-advancing modifications until unfreeze modification is serialized and processed. In case of deferment, all clients shift the position of the last advancing modification before an unfreeze to right after the unfreeze modification in their serialized modifications stream, and process the modification in the new position. In the case of destruction, all intervening advancing modifications are simply ignored. Serialized freeze and unfreeze modifications work as toggles for each other. Also, a sequence of serialized freezes without intervening serialized unfreezes counts as just one freeze, and a sequence of serialized unfreezes without an intervening serialized freeze counts as one. Serialized unfreezes without any proceeding serialized freezes are ignored. Again note that the serialized processing of freeze and unfreeze modifications face the same rollback hazards faced by other modifications.

FIG. 5 illustrates a computation of checkpoints. In this illustration, three clients are assumed, Client1, Client2 and Client3, with timestamps E. Since timestamp E of Client2 is the earliest of the three, it is chosen and all modifications having a timestamp below this value are deleted.

Working with a Practical, Global, Synchronized, Distributed Clock

The timestamps in the algorithm described above rely upon the existence of a shared, global clock across the clients. A perfect global clock is not practically realizable across a generic distributed system, but an acceptable approximation can be achieved in practice using independent communication. The problem of providing a common time reference to all nodes in a distributed system has been well studied over the years, and several clock synchronization schemes have been developed. See, for example, Leslie Lamport and P. M. Melliar-Smith, "Synchronizing Clocks in the Presence of Faults", *Journal of the ACM*, vol. 32, no. 1, January 1985, pp. 52–78, David Mills, "Improved Algorithms for Synchronizing Computer Network Clocks", *IEEE/ACM Transactions on Networking*, vol. 3, no. 3, June 1995, pp. 245–254, Hermann Kopetz and Wilhelm Ochsenreiter, "Clock Synchronization in Distributed Real-Time Systems", *IEEE Transactions on Computers*, vol. C-36, no. 8, August 1987, pp. 933–940, and Leslie Lamport, "Time, Clocks and the Ordering of Events in a Distributed System", *Communications of the ACM*, vol. 21, July 1978, pp. 558–565. Our collaboration system is constructed atop a system-wide synchronized global clock without regard to how the synchronization is achieved. The system is thus compatible with—any of these existing global clock schemes.

A common assumption is that each node has its own local clock implemented using a combination of hardware and software—usually a variable-frequency quartz oscillator coupled with a counter that is incremented with each tick of the oscillator. The node derives a logical time from its local counter, and periodically synchronizes its counter with other nodes in the distributed system, so that any two nodes remain within a tolerable offset of each other. The oscillator's frequency can usually be increased or decreased by a small amount, to allow the clock to converge in the appropriate direction towards the global consensus time.

The Network Time Protocol (NTP), described by David Mills, "Internet RFC 1305: Network Time Protocol (version 3), and David Mills, "Internet Time Synchronization: The Network Time Protocol", *IEEE Transactions on Communications*, vol. 39, no. 10, 1991, pp. 1482–1493, which has been developed for use on the Internet, is a popular example of a clock synchronization scheme. It has already been deployed on over 100,000 Internet hosts and routers, and provides accuracies of the order of tens of milliseconds on wide-area networks, and sub-milliseconds on local networks. NTP uses a set of primary time servers which are synchronized to highly accurate physical clocks (such as atomic clocks or satellite-based Global Positioning System (GPS)). Secondary servers and clients synchronize to these primary servers using a hierarchical subnet. The protocol peers periodically exchange messages containing their timestamps. These are used for determining the communication delays in the network, as well as clock offsets between the peer clocks. A filtering algorithm selects the best out of a moving window of clock offset samples. Then, an intersection algorithm is applied to find the best subset of servers believed to be accurate and fault-free. A combining algorithm computes the weighted average of offsets. Finally, a feedback loop controls the variable frequency oscillator of the local clock, to improve its accuracy and stability. The protocol is described in detail in Internet RFC 1305. A simplified form of this protocol, called the Simple Network Time Protocol (SNTP) is described in David Mills, Internet RFC 2030: Simple Network Time Protocol (version 4). If the accuracy and performance of the full-fledged NTP is not required, the SNTP can be used instead.

Lamport and Melliar-Smith, supra, have described a simpler "interactive convergence" protocol that takes a different approach to correcting for the slow drifting apart of clients' clocks. It is based on the assumption that a client process can determine the difference between its clock and that of another client, within a specified error bound. Also, all clocks must be initially synchronized to approximately the same value. Clocks are re-synchronized sufficiently frequently, so that they never drift apart by more than a specified $\delta$. Each client periodically initiates a round of message exchanges to determine the offsets of all other clients' clocks from its own. If an offset is larger than the $\delta$ value, it is replaced by zero. Then, all the offsets are averaged, and the local clock value is incremented by this average. This algorithm is fault-tolerant to the extent that if one-third of the clients' clocks are faulty, the remaining clocks will nevertheless remain synchronized to within the specified $\delta$. It also tolerates failures of the type where a clock incorrectly reports entirely different values to different peers (known as two-faced clocks). The assumption that the clients' clocks are initially synchronized can be satisfied by means of a startup sequence in which the initiator of a collaboration session broadcasts its clock value to all other participants. Based on a priori knowledge of the network, we can obtain a value of $\delta$ such that all clients' clocks are initialized within $\delta$ of each other. An alternative is to manually synchronize the clocks initially (e.g., all participants use a telephone channel to arrive at a consensus start time). As long as the clients synchronize their clocks with adequate frequency, they will remain within this tolerance limit of each other.

A more complex protocol called "interactive consistency" described by Lamport and Melliar-Smith, supra, requires more message exchanges between the clients. However, it uses the median of clock offsets rather than the average, thus avoiding statistical problems due to outliers. It also works correctly in the presence of faults, as long as less than one-third of the clients are faulty. A further refinement of this algorithm requires the use of digitally signed messages to eliminate the corruption (by faulty clients) of messages sent by non-faulty clients. By doing so, it improves its fault tolerance—non-faulty clients remain synchronized as long as less than one-half of the clients are faulty.

Our work places only one requirement on the distributed clock scheme that can be used to support it: the local clock of each client must increase in time monotonically. Clearly, a malicious user with access to the local clock of a client machine can reset it and thus violate this requirement. We require that such malicious behavior be screened out or ruled out prior to the provision of a distributed clock to our scheme. Within the assumption of monotonically increasing timestamps on each client, it is straightforward to see why our scheme is always robust: monotonic timestamps are needed and only serve to define one serialization order on the modifications; any good or bad serialization is acceptable since in a strict, correctness sense all that is needed to be ensured for synchrony is that all clients serialize the modifications in an identical manner. Thus, the only benefit of the timestamps being close to an ideal global clock is that the quality of serialization and, thus, collaboration increases. The issue of collaboration quality and distributed clock jitter is discussed in a later section on modifications varieties.

Coming to some suggestions, in our system, if each client machine merely implements the NTP/SNTP, the clients' clocks will remain synchronized to within a few tens of milliseconds of each other. Since the application involves interactive modification of a workspace, typically the duration between modifications (and therefore between messages exchanged by clients) is expected to be significantly large compared to this clock accuracy. The serialization protocol should therefore be unaffected by the relatively small discrepancies between the clocks on different clients. However, the NTP has the drawback that it requires modifications to the operating system kernel, and adds complexity to the system that may not be justified for our collaboration application. An easier way to provide the illusion of a global, synchronized clock for all clients participating in the collaboration session would be to use the "interactive convergence" protocol described above.

Figure 7:
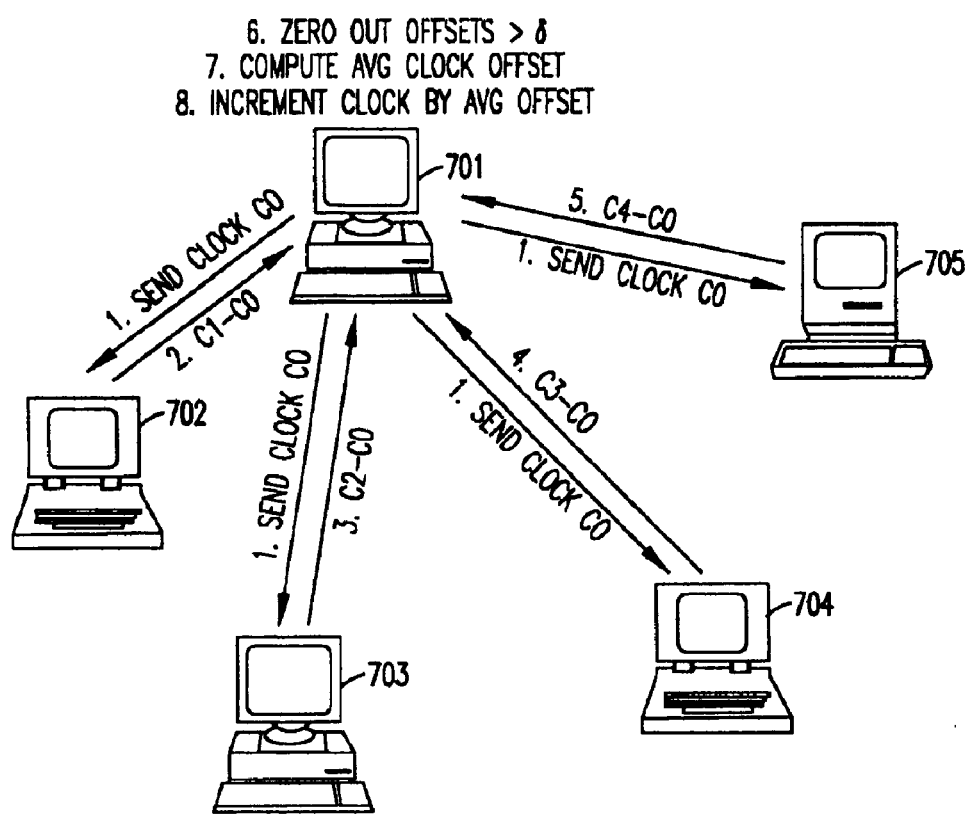
FIG. 7 is a schematic diagram showing the scheme of clock synchronization using interactive convergence.
Figure 8:
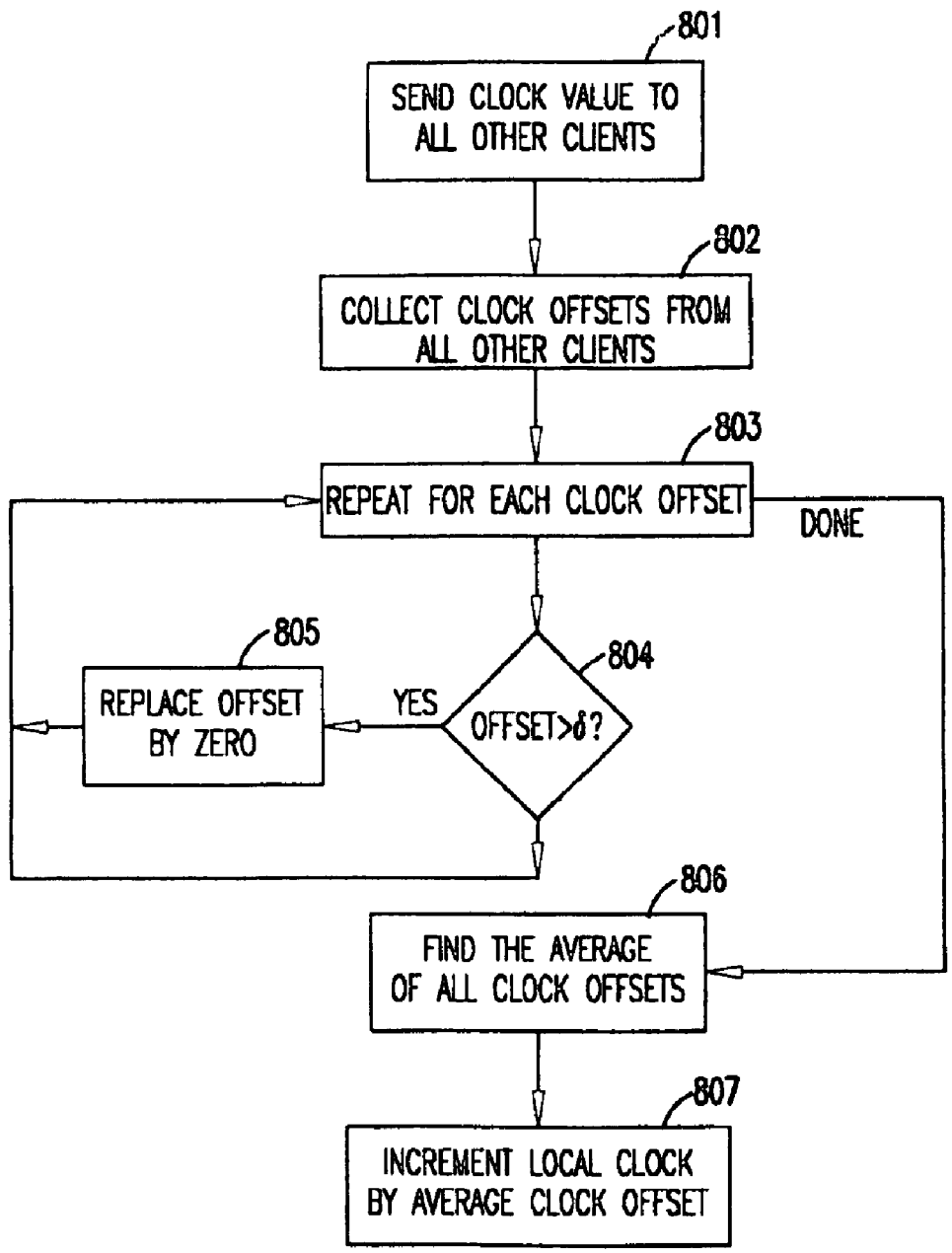
FIG. 8 is a flow diagram showing the procedure for interactive convergence-based clock synchronization.

FIG. 7 and FIG. 8 illustrate the operation of this protocol. Referring first to FIG. 7, five clients 701 to 705 communicate with each other over a peer-to-peer network. Client 701 broadcasts a clock time C0 to each of the other clients 702 to 705, and each of these other clients respond with a time difference or offset C1-C0, C2-C0, C3-C0, and C4-C0, respectively. The client 701 zeros out offsets which are greater than $\delta$ and then computes an average clock offset which is used to increment the global clock.

The process is illustrated in the flow diagram of FIG. 8. The process begins by sending a clock value to all other clients in function block 801. The clock offsets are collected from the other clients in function block 802. At this point a processing loop is entered which is repeated for each clock offset, as indicated by function block 803. For each offset, a test is made in decision block 804 to determine if the offset is greater than $\delta$. If it is, then the offset is replaced by zero in function block 805. Once this processing is completed for each clock offset, the average of all clock offsets is computed in function block 806. Finally, the local clock is incremented by the average clock offset in function block 807.

An alternative which is always available to the users of the system is to use manual intervention to re-synchronize their local clocks, using a communication mechanism such as a telephonic conference.

Dynamic Clients

In a collaboration session with dynamic clients, a client can leave or join the collaboration session at any time. An easy way to provide this functionality is for the collaboration participants to create proxy clients in advance using certain estimate of how many clients might join the collaboration session. This estimate is determined a priori before the beginning of the collaboration session. When unoptimized, the proxy clients function just like any other client, the only difference with other clients being that no ordinary modifications are sent by them to the rest of the participants. When a client wants to dynamically join the collaboration session, it substitutes for one of these proxy clients and joins the session. Once a client has joined the collaboration session it starts sending modifications using the FIFO channels of communication just like any other pre-existing client. A client can leave the collaboration session at any time. The process of leaving adds a proxy client to the collaboration session and the rest of the participants stop getting ordinary modifications from it.

The above solution, though easy to implement, is inefficient and leads to a lot of resource waste. A more efficient solution without any proxy clients can be provided which is discussed in the next section.

A client that seeks to be added to a collaboration session midway through the session has to contact one of the participants with a request for that purpose. This is a natural requirement for the dynamic client since it has to know at least one client to be able to join the collaboration session. The client contacted can forward the joining client to another existing client if it finds itself not adequately equipped for the request In this manner, finally the joining client reaches a client who then introduces the client to the group as the new joinee and sends the new joining request on behalf of the joinee. The joining request is an artificial modification which includes a requirement that clients freeze all checkpoint advance.

After freezing checkpoint advance, all the pre-existing clients (including the introducer) of the collaboration session acknowledge to the introducer, using independent communication, the joining request sent by the introducer. However, each client ensures that it has created FIFO channels to the new joinee prior to sending an acknowledgment to the introducer. Each acknowledgment carries with itself a timestamp of when the acknowledgment was created, which happens only after the corresponding FIFO channel has been created. A client's acknowledgment's timestamp thus unambiguously partitions all modifications created by the client into those that precede the acknowledgment and those that succeed the acknowledgment.

Prior to sending its acknowledgment, when a client contacts the joining client to form a FIFO channel to the joining client, the joining client ensures that it has formed its incoming modifications queue from the client's channel at the same time or before the formation of the channel. Separately, and concurrently, the joining client forms its (trivial) channel and incoming queue for itself in the process, but without communicating with the introducer or anyone else for the purpose.

After sending the acknowledgments, the collaboration participants start sending their modifications to the new client also, which has its modifications-receiving machinery ready before this time. The partition of modifications that follow an acknowledgment are all communicated to the joining client directly via this already-ready modifications-receiving machinery. Separately, by independent communication, the dynamic client gets the current global clock value from the introducer by using the method of the clock distribution scheme and subsequently stays in synchrony with the distributed clock following the method of the distributed clock.

The introducer of the joining client waits for acknowledgments from all the pre-existing participants. Once all acknowledgments are received, it hands over to the joining client, the frozen check point workspace that of course precedes all acknowledgment timestamps. Besides such a check point, for each pre-existing participant, the introducer also hands over all of the participant's modifications from the check point up to the acknowledgment timestamp for the participant. Modifications after acknowledgments are received by the joining client directly from pre-existing participants, and it is not the responsibility of the introducer to deal with those modifications for the joining client. The dynamic client starts serializing the list of modifications it gets from the introducer and the pre-existing clients and starts incorporating them into the workspace starting from the check point. From this time onwards the dynamic client can participate in the collaboration session as any other client. The first thing that the dynamic client sends as a modification is an artificial modification to all clients telling them that the freeze on the check pointing mechanism is over, and that check points can be advanced as usual. In case of a rollback in the collaboration session back to the last checkpoint, the joining process has to be restarted from the introducing client's joining request onwards. Some amount of reuse from the past attempt can be made—the joining client can continue with the frozen-checkpointed workspace that it has got, and clients can continue with the channels they previously created to the joining client. Except for such optimizations, the entire joining process has to be gone through again.

Figure 9:
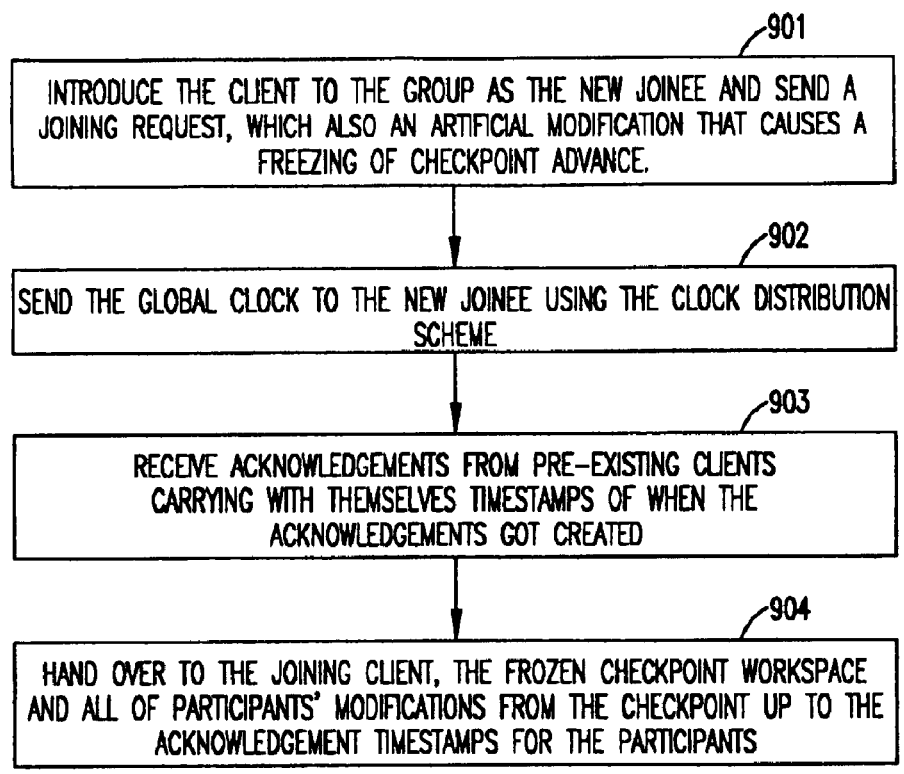
FIG. 9 is a flow diagram showing the procedure followed by a client in introducing a joining client to an ongoing collaboration.
Figure 10:
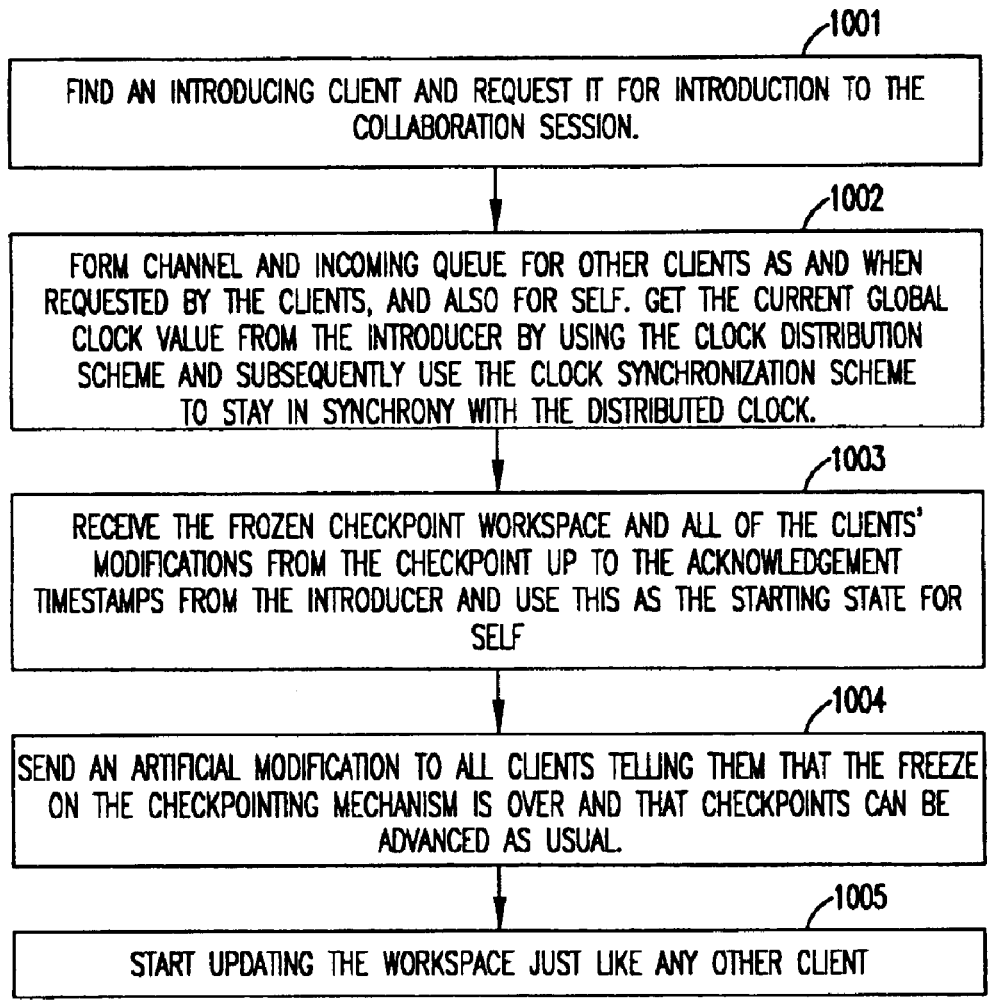
FIG. 10 is a flow diagram showing the procedure followed by a dynamic client in joining an ongoing collaboration.

The above discussed procedures followed by an introducer and a joining client are illustrated in FIGS. 9 and 10, respectively. Referring first to FIG. 9, the introducer introduces the client to the group as the new joinee and sends the new joining request, which is also an artificial modification that causes a freezing of checkpoint advance, in function block 901. The introducer then sends the global clock to the new joinee using the clock distribution scheme in function block 902. Acknowledgments are received from pre-existing clients in function block 903. These acknowledgments carry timestamps of when the acknowledgments got created. Finally, the introducer hands over to the joining client, the frozen checkpoint workspace and all of the participants' modifications from the checkpoint up to the acknowledgment timestamps for the participants in function block 904.

As shown in FIG. 10, the dynamic client finds an introducing client and requests it to make an introduction to the collaboration session in function block 1001. The client then forms its channel and incoming queue for other clients as and when requested, and also for itself, and gets the current global clock value from the introducer in function block 1002. The client gets the global clock value by using the clock distribution scheme and subsequently uses the clock synchronization scheme to stay in synchrony with the distributed clock. Next, the client receives the frozen checkpoint workspace and all of the client's modifications from the checkpoint up to the acknowledgment timestamps from the introducer in function bock 1003 and uses this as the starting state for itself. The client then sends an artificial modification to all clients telling them that the freeze on the checkpointing mechanism is over and that checkpoints can be advanced as usual in function block 1004. After this point, the client starts updating the workspace just like any other client of the collaboration session in function block 1005.

A way to optimize the above processing is for the introducer to hand over the following workspace and modifications to the new joinee: The introducer gets the last acknowledgment and incorporates all the modifications from the frozen checkpoint until its (the introducer's) current timestamp E after the last acknowledgment. Ordinarily, the introducer does this incorporation as a usual activity for itself, thus such an incorporation for the joinee costs the introducer nothing significant to carry out. The introducer then gives this workspace, the timestamp E, and all the modifications from E onwards up to the respective acknowledgments of the various pre-existing participants to the new joinee. For keeping up with the checkpointing scheme, the introducer can either also provide the checkpoint directly to the new joinee, or it can inform the joinee that the checkpoint is available with the introducer if the need for the checkpoint arises for the new joinee. The dynamic client upon getting the workspace and the list of modifications starts serializing and incorporating them into the workspace starting from the timestamp E sent by the introducer. The client abandons all modifications it has got from pre-existing client with a timestamp less than E. As in the un-optimized case, the client sends an artificial modification announcing checkpoint unfreeze at the outset in this optimized case also.

A client that wants to leave the collaboration session partway through the session sends an artificial modification for the purpose to the group. The artificial modification causes the following behavior at the formation of the first checkpoint of a timestamp E which is equal to or later than the timestamp of the artificial modification. All the collaboration participants, upon the formation of the checkpoint, close their FIFO channels and queues to and from the client, and the client is then allowed to disconnect. If a rollback to the last checkpoint causes the elimination of the artificial modification for the client leaving, then the client has to send the request for leaving again.

Figure 11:
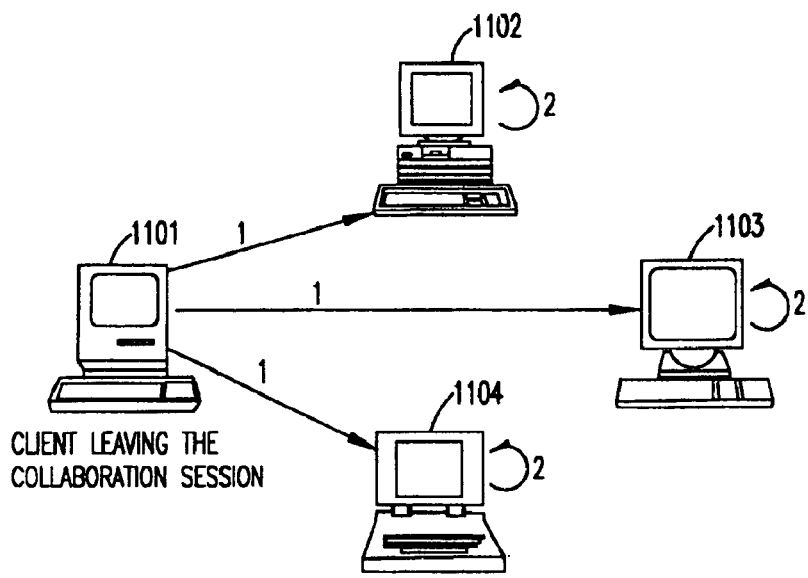
FIG. 11 is a schematic diagram showing the scheme followed by a client in leaving an ongoing collaboration.

This scheme is generally illustrated in FIG. 11. Here, four clients 1101 to 1104 are shown, and client 1101 wants to leave the collaboration session. Client 1101 does this by sending a request, an artificial modification, for the purpose of leaving the collaboration session. Eventually, when a checkpoint is formed whose E value is greater than or equal to the timestamp of the artificial modification sent by the leaving client, each client removes channels to and from it.

Modification Varieties and Collaboration Quality

A real-time collaboration implementation is parameterized by decisions such as what a modification is. In the context of an unpartitioned workspace, a modification can be a sequence of user-level operations; and/or some translation of the same. A modification can also be the complete, changed workspace itself, or it can be a workspace difference—changed workspace minus unchanged workspace. In the context of a partitioned workspace, the definition of a modification shifts to a partition-to-partition basis. So a modification is either operations on a workspace partition and/or their translation, a complete, changed workspace partition, or a workspace partition difference. When a modification is defined as a workspace partition difference, or a sequence of operations on a workspace partition and/or their translation, then the modification requires a context before it can be applied. The context has to provide the unchanged partition upon which the application of the sequence of operations or partition difference can yield the changed partition. When a modification is defined as a complete, changed partition, then it carries the context of the modification with itself. This means that the modification by itself is sufficient to determine uniquely the changed partition, which in this case is trivially true, since the modification is itself the changed partition. Differences in the choice of the definition of a modification can lead to different behaviors of real-time collaboration at the user level. When a modification carries its context with itself, then it is always the case that collaboration participants see the shared workspace change and develop as per some series of intentions of the individual participants. On the other hand, when a modification does not carry its context with itself, then it is possible for the modifications to compose in some manner that is out of context of what the participants intended. For example, two participants attempting to delete the same word in a text document can send delete operations out at the same time. The result can well be the successful deletion of the target word along with an unintended deletion of the word preceding the target word in the text document. A shared workspace can thus develop unintended changes including even nonsensical and erroneous changes (run-time errors) during a collaboration session when the definition of modifications used does not require the carriage of modification context with individual modifications. When a modification carries its context with itself, then collaboration participants can see the analogue of acoustic echos in real-time collaboration: A distant/low-bandwidth-linked participant can send out modifications that repeatedly set the shared workspace back to a state that is far behind what the other better-connected participants have developed it to. This happens because the distant participant lags behind the others in the state of the workspace he works with, and thus even though his timestamps are accurate, the timestamped modifications are made in the context of old workspace state. The participants are thus forced to deal with echos of the workspace coming back from the distant participant. The peer-to-peer, timestamp- and priority-based serialization protocol of this disclosure can work with any of the modification definitions given above. In particular, the protocol supports inter-partition synchronization by allowing a modification to cover multiple partitions, wherein all kinds of partition hierarchies and groups can comprise the multiple partitions.

A rough equivalent of workspace echos coming from a distant participant can be replicated in a nearby client simply by ensuring that the client's clock lags behind the distributed clock. As in echos, this will ensure that the client's modifications of the workspace are serialized and viewed ahead of others' modification. Now consider the case when a client's clock leads the distributed clock. In this case, the client's modifications will tend to be serialized after others' modifications. In the case of a clock jitter on a client, the jitter will tend to cause the placement of the client's modifications ahead or behind the neighboring modifications of others. While individual participants may end up being able to see and modify the workspace that is displayed to them by their client machines, their ability to have their modifications serialized as per the physical, global time of the modification contexts can end up being compromised by the jitter/distribution of individual clocks. Clearly, in a bad case, a client with a clock that is stuck will keep on dictating modifications to others (and cause numerous rollbacks). In this case, although the synchrony of the collaboration session will be maintained, the quality will not and instead of being shared, the collaboration will become one sided. Other bad cases of clock distribution and jitter can result in unresponsive and/or hard-to-control collaboration, upon which the users may find it better to cue the system to switch the collaboration back-end as discussed later.

Locked Use of Workspace Partitions

When a collaboration system provides a locking mechanism on a workspace or a workspace partition, then the collaboration system allows its clients some means to acquire and release a lock on the workspace or workspace partition. At any time, only one client can be holding a lock on the workspace/workspace partition. When a client holds a lock on a workspace/workspace partition, then only that client can make modifications to that workspace/workspace partition. All other clients are blocked out from making modifications to the workspace/workspace partition during that time. A client holds a lock on a workspace/workspace partition from the time it successfully acquires a lock on the workspace/workspace partition and up to the time it releases the lock on the workspace/workspace partition.

A client that wants to lock a workspace partition sends an artificial modification for the purpose to all the participants. For a partition, the first serialized locking modification on the partition locks the partition for the sole use of the locking client. All modifications on the partition from other clients in the serialized stream are ignored until an artificial modification for unlocking is received from the same client. Following unlocking, the partition is available for modification and locking to all. Since locking and unlocking are artificial modification based, the schemes face the usual rollback hazards of other modifications. It is up to a client to seek locking or unlocking afresh in case of a rollback to the last checkpoint. Locking and unlocking only affect the contents of a workspace or workspace partition, and thus do not prevent the ordinary process of artificial modifications. The process of locking and unlocking can continue throughout the collaboration session.

Figure 12:
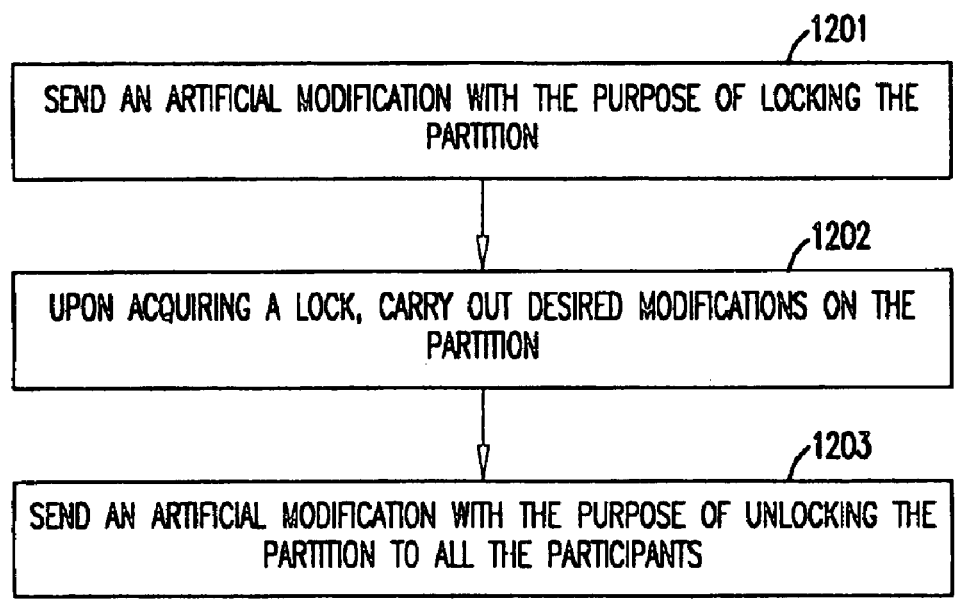
FIG. 12 is a flow diagram showing the process for acquiring and releasing a locked stretch on a partition in a straightforward way.

The locking and unlocking scheme is illustrated in FIG. 12. A client sends an artificial modification with the purpose of locking the partition in function block 1201. The client, upon acquiring a lock, carries out desired modifications on the partition in function block 1202. When completed, the client sends an artificial modification with the purpose of unlocking the partition to all the participants in function block 1203.

Use in Conjunction with Distributed Server

If the performance of the peer-to-peer serialization protocol presented in this disclosure degrades due to poor client and/or network response, then the protocol allows for a seamless, dynamic switch over to another scalable serialization, protocol that is presented in co-pending patent applications Ser. Nos. 09/241,991 and 09/476,445. The decision to switch to the distributed server disclosed in the co-pending patent applications Ser. Nos. 09/241,991 and 09/476,445 can be based on an increase in the number of rollbacks faced in the peer-to-peer protocol, latency degradation of the peer-to-peer protocol, and also manual cues from the users of the system.

Switching to a distributed server can be accomplished as follows. A client sends an artificial modification which, upon serialization, identifies the checkpoint just succeeding the serialized modification (i.e., the checkpoint whose E value is greater than or equal to the timestamp of the switch over modification) as the checkpoint after which the distributed server is to be used. In case the artificial modification gets abandoned due to a rollback to the checkpoint preceding the modification, the client which sent the artificial modification has to resend the artificial modification. This repeats until a check point succeeding the artificial modification is successfully formed. The distributed server starts out with an initial workspace that comprises of the check point identified above. In case of serious degradation of performance, an immediate switching can be ordered by an artificial modification for the purpose, whereupon a rollback-to-last-checkpoint is carried out and distributed-server-based collaboration is started from the last checkpoint.

Switching back from a distributed server can be accomplished as follows. Every client leaves the collaboration session except one. The workspace is then check pointed straightforwardly by the one client, and timestamp-based collaboration started from that check point, with the checkpoint serving as the initial workspace. The decision to switch back can be left to the distributed server system, or else the switch can be made periodically, or say a few channels be kept and monitored for communication delays with the purpose of informing the distributed server when to switch back to the timestamp and priority-based serialization protocol.

Figure 13:
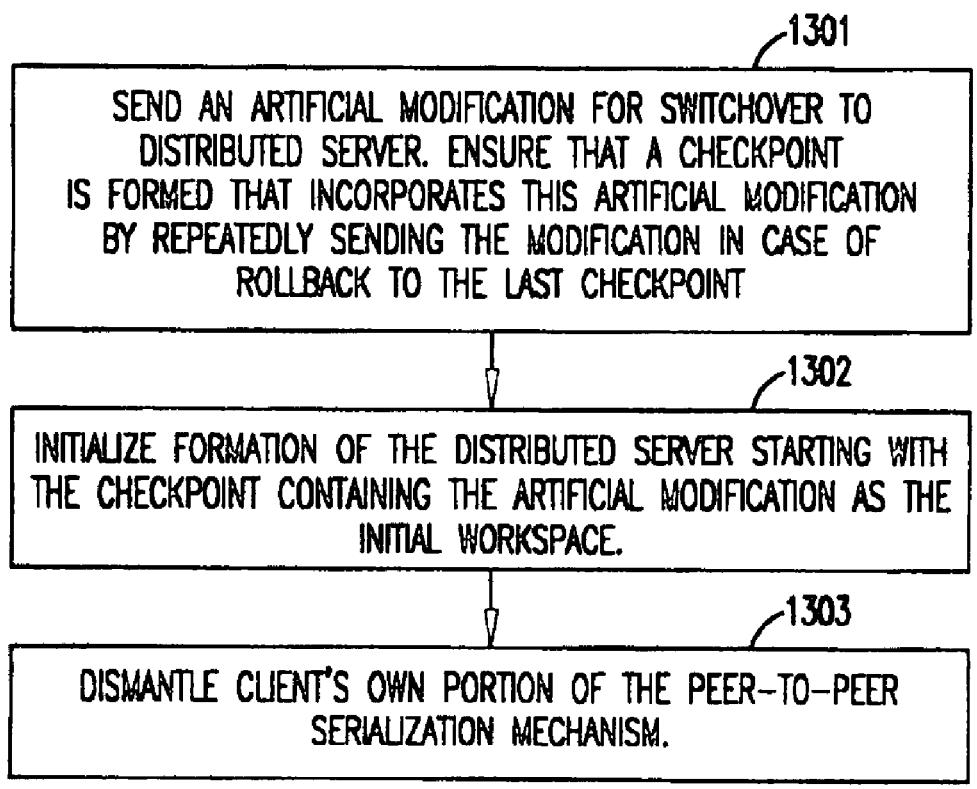
FIG. 13 is a flow diagram showing the process followed by a client initiating a switch to a distributed server.
Figure 14:
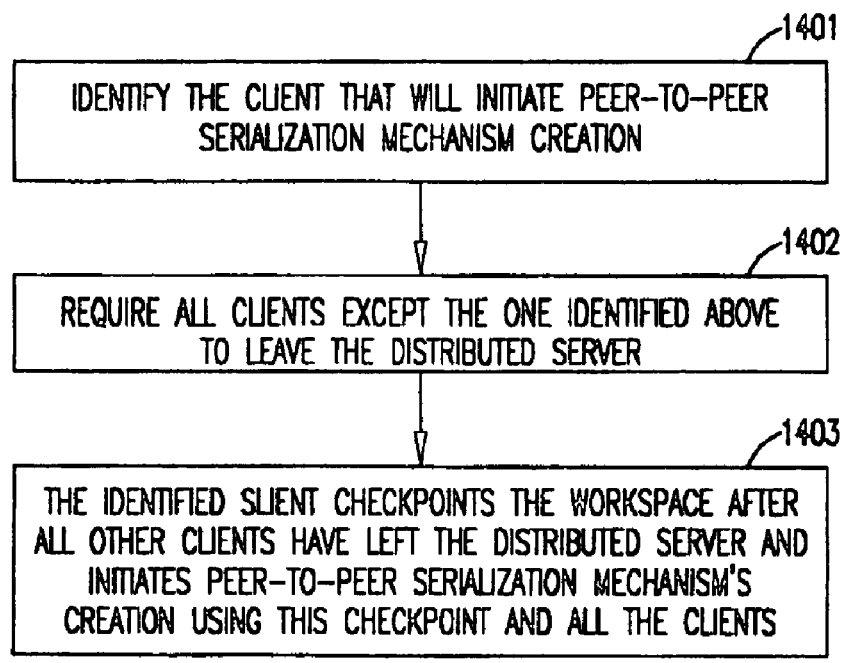
FIG. 14 is a flow diagram showing the process followed by a distributed server in switching back.

FIGS. 13 and 14 illustrate switching back and forth from the peer-to-peer protocol and a distributed server. In FIG. 13, an artificial modification for switch over to distributed server is sent in function block 1301. To ensure that a checkpoint is formed that incorporates this artificial modification, the modification is repeatedly sent. Next, a distributed server is formed with the checkpoint after the artificial modification serving as the initial workspace in function block 1302. Finally, the client's own portion of the peer-to-peer serialization mechanism is dismantled in function block 1303. To switch back in FIG. 14, the client that will initiate peer-to-peer serialization mechanism creation is first identified in function block 1401. All clients, except the one identified in function block 1401, are required to leave the distributed server in function block 1402. The client identified in function block 1401 then checkpoints the workspace after all other clients have left the distributed server and initializes peer-to-peer serialization mechanism's creation using this checkpoint and all the other clients in function block 1403.

Conclusion

The invention disclosed herein, serverless real-time collaboration, also addresses the efficiency and scalability issue raised by the distributed server. The invention here does this by providing a way of eliminating the use of a software serialization server entirely and by providing a useful protocol by which front-end clients alone can carry out real-time collaboration without relying on a centralized or distributed server as a back-end. The protocol thus relies solely on peer-to-peer communication, wherein the peers are the clients of a collaboration session. The peer-to-peer protocol disclosed here can be used as an alternative to the distributed server disclosed in co-pending application Ser. No. 09/241,991, or as an addition to the distributed server that falls back upon the distributed server if the need arises, in order to increase the throughput/efficiency of real-time collaboration.

The peer-to-peer protocol provided herein is based on the use of global timestamps and client priorities in serializing modifications to a shared workspace of real-time collaboration. The method provided herein caters to dynamic clients wherein a client can leave or join an ongoing collaboration session as long as there is always at least one client present/ remaining in the collaboration session. The method can support multiple definitions of a modification, including partitioning-based definitions, wherein the method provides full support for locking of partitions, and a full treatment of inter-partition synchronisation via a modification definition over multiple partitions. The method is capable of utilizing the many standard methods of creating a global, distributed, synchronized clock for the global timestamps utilized by it. The method is rollback-based for correcting tentative but incorrect serializations, and provides additional backup in terms of checkpoints for additional safety and for the support of lightweight, pervasive clients. The method includes many optimizations for efficiency, and includes a method of switching to and back from distributed server-based serialization for the periods when the network response is better suited to a distributed server than the peer-to-peer protocol.

In comparison to the centralized server and the distributed server, the invention disclosed herein further improves interoperability across heterogeneous software/hardware platforms by (a) providing a new method of improving efficiency and scalability of real-time collaboration without relying on the use of any special support from the network/back-end supporting the collaboration session, (b) being able to work in conjunction with a distributed server for providing, a better improvement in efficiency/scalability/throughput of real-time collaboration, and (c) providing special support via optimizations; and methods oriented towards lightweight clients suited to pervasive devices, which are likely to comprise a large part of heterogeneous environments in the near future.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A method of improving the scalability of real-time collaboration among clients in a peer-to-peer network comprising the step of providing a timestamp and priority-based serialization protocol that can substitute for a centralized server-based serialization protocol of a real-time collaboration session.

2. The method of claim 1, wherein the timestamp used is based on one global clock which is distributed and kept synchronized among the clients participating in the collaboration session.

3. The method of claim 2, wherein clock distribution and maintenance of clock synchrony is done by Network Time Protocol (NTP).

4. The method of claim 2, wherein clock distribution and maintenance of clock synchrony is done by Simple Network Time Protocol (SNTP).

5. The method of claim 2, wherein clock distribution and maintenance of clock synchrony is done by an interactive convergence protocol.

6. The method of claim 2, wherein clock distribution and maintenance of clock synchrony is done by of manual intervention and manual cues.

7. The method of claim 1, wherein clients are fully connected to each other by first-in, first-out (FIFO) communication channels.

8. The method of claim 1, wherein incorrect serializations of modifications can occur, which then can be undone and corrected using a rollback mechanism.

9. The method of claim 8, wherein rollback of serialization decisions have well-defined and known, upper and lower time/timestamp bounds.

10. The method of claim 9, including optimizations which eliminate a need for rollback when an accompanying latency and communication costs are acceptable.

11. The method of claim 9, including checkpoints in order to provide additional safety and reduce memory requirements arising from the rollbacks.

12. The method of claim 9, wherein checkpoints can be all be locally stored by each client, or shared by multiple clients with say only one checkpoint storage for the multiple clients, the multiple clients sometimes being restricted to being only neighbors of each other.

13. The method of claim 1, wherein as long as there is at least one client present in a collaboration session at anytime, any client participating in the collaboration session can be either dynamic or static, which means that either the client can participate in the collaboration session from start to finish, or it can join and/or leave the collaboration session while the session is ongoing.

14. The method of claim 13, wherein dynamic joining of clients is based on a checkpoints mechanism.

15. The method of claim 14, including an optimization wherein an introducer for a dynamically joining client provides a more developed version of a workspace than a checkpoint identified for the joining client, thereby reducing computation, space requirements and communication requirements for the joining purpose.

16. The method of claim 14, wherein a more developed version of a workspace provided by an introducer can comprise a checkpoint identified for joining, developed further by incorporating all serialized modifications available with the introducer up to or before a rollback window for the introducer at the time of communicating the workspace to the joining client.

17. The method of claim 1, wherein multiple definitions of a modification are supported, including partitioning-based modifications.

18. The method of claim 17, wherein partitioning-based modifications are fully supported, including inter-partition synchronisation via modifications over multiple partitions, wherein multiple partitions can comprise all kind of partition hierarchies and partition groups.

19. The method of claim 1, wherein locking and unlocking of workspace partitions are supported.

20. The method of claim 19, wherein the support for locking and unlocking reuses a serialization mechanism.

21. The method of claim 1, including an optimization for light-weight clients wherein a back-end process takes over storage intensive aspects of serialization that would ordinarily be carried out by the clients themselves.

22. The method of claim 1, including dynamically switching to a distributed server and back in order to utilize a distributed server for periods of network response when a distributed server is better suited to supporting real-time collaboration than the serialization protocol.

23. The method of claim 1, wherein interoperability is improved across heterogeneous software/hardware platforms by improving efficiency and scalability of real-time collaboration without relying on any specialized support from the network/back-end supporting the real-time collaboration.

24. The method of claim 1, wherein interoperability in heterogeneous environments is improved by being able to work in conjunction with a distributed server for providing an improvement in the efficiency/scalability/ throughput of real-time collaboration.

* * * * *